(12) United States Patent
Hirata et al.

(10) Patent No.: US 7,422,704 B2
(45) Date of Patent: Sep. 9, 2008

(54) PHOSPHORESCENT PHOSPHOR AND METHOD OF MANUFACTURING THEREOF

(75) Inventors: Yoneichi Hirata, Tokyo (JP); Tomoya Sakaguchi, Tokyo (JP); Nobuyoshi Takeuchi, Tokyo (JP)

(73) Assignee: Nemoto & Co., Ltd., Tokyo (JP)

( * ) Notice: Subject to any disclaimer, the term of this patent is extended or adjusted under 35 U.S.C. 154(b) by 272 days.

(21) Appl. No.: 10/551,424

(22) PCT Filed: Nov. 5, 2004

(86) PCT No.: PCT/JP2004/016400

§ 371 (c)(1),
(2), (4) Date: Sep. 30, 2005

(87) PCT Pub. No.: WO2005/044945

PCT Pub. Date: May 19, 2005

(65) Prior Publication Data

US 2007/0096058 A1    May 3, 2007

(30) Foreign Application Priority Data

Nov. 6, 2003    (JP) .............................. 2003-377414

(51) Int. Cl.
C09K 11/55    (2006.01)

(52) U.S. Cl. .............................................. 252/301.4 R

(58) Field of Classification Search ........... 252/301.4 R
See application file for complete search history.

(56) References Cited

U.S. PATENT DOCUMENTS 5,424,006 A * 6/1995 Murayama et al. .... 252/301.4 R
5,686,022 A * 11/1997 Murayama et al. .... 252/301.4 R

FOREIGN PATENT DOCUMENTS

| GB | 1190520 | 5/1970 |
|----|---------|--------|
| JP | 7-11250 | 1/1995 |
| JP | 08-127772 | 5/1996 |

OTHER PUBLICATIONS

U.S. Appl. No. 10/578,575, filed May 5, 2006, Hirata, et al.

* cited by examiner

Primary Examiner—C. Melissa Koslow
(74) Attorney, Agent, or Firm—Oblon, Spivak, McClelland, Maier & Neustadt, P.C.

(57) ABSTRACT

A phosphorescent phosphor having excellent afterglow luminance characteristics, even under low illumination intensity of radiation conditions, compared to conventional strontium aluminate phosphorescent phosphors of the same type, and particularly a phosphorescent phosphor having excellent initial afterglow luminance characteristics and excellent afterglow luminance characteristics at 60 and 90 minutes after cessation of the excitation, with following requirements:

$0.015 < Eu/(Sr+Ba+Eu+Dy) \leq 0.05, 0.3 \leq Dy/Eu \leq 2,$ $0.03 \leq Ba/(Sr+Ba) \leq 0.2$ and $2.1 \leq Al/(Sr+Ba+Eu+Dy) \leq 2.9.$

7 Claims, 3 Drawing Sheets

PHOSPHORESCENT PHOSPHOR AND METHOD OF MANUFACTURING THEREOF

TECHNICAL FIELD

The present invention relates to a phosphorescent phosphor, and more particularly to a phosphorescent phosphor having excellent afterglow characteristics when excited under low illumination.

BACKGROUND ART

Generally, the afterglow time of a phosphor is extremely short, i.e., the light emitted from the phosphor rapidly decays after external excitation is stopped. However, after being excited with ultraviolet radiation or the like, some phosphors rarely show afterglow which can be perceived by the naked eye for a considerable time (ranging from several tens of minutes to several hours) even after the excitation is stopped. Such phosphors are called phosphorescent phosphors or phosphorous materials as distinguished from normal phosphors.

Sulfide phosphors such as CaS:Bi (which emits violet blue light), CaSrS:Bi (which emits blue light), ZnS:Cu (which emits green light) and ZnCdS:Cu (which emits yellow or orange light) are known as such phosphorescent phosphors. However, any of these sulfide phosphors has many problems from a practical viewpoint, e.g., chemical instability, poor photo-resistance. Moreover, even when this zinc sulfide phosphor is used for a luminous clock, afterglow allowing the time to be perceived by the naked eye lasts only about 30 minutes to 2 hours.

Thus, the applicant invented a phosphorescent phosphor comprising a compound expressed by $MAl_2O_4$ as a matrix, in which M is at least one metal element selected from the group consisting of calcium, strontium and barium, as a phosphorescent phosphor which has afterglow characteristics that last much longer than those of commercially available sulfide phosphors, chemical stability and excellent photo-resistance for a long time, and obtained a patent thereof (see Japanese Patent No. 2543825 Publication: patent document 1).

Owing to the invention of the aluminate phosphorescent phosphor described in the patent publication, it has become possible to provide a long-afterglow phosphorescent phosphor which has afterglow characteristics that last much longer than those of conventional sulfide phosphors, chemical stability due to an oxide, excellent photo-resistance and broad applicability to various usage.

DISCLOSURE OF THE INVENTION

However, further market needs, especially needs for safety applications using the phosphorescent phosphor in low illumination environments, such as release handles for escape in automobile trunks, and safety signs for escape guidance in the interiors of subway systems, tunnels, ships, airplanes and the like have grown, and high afterglow luminance characteristics have been required in excitation conditions at lower illumination.

For example, low illumination conditions, i.e., excitation for 60 minutes at 5 ft-c (approx. 54 lx), are regulated in UL 924 "Emergency Lighting and Power Equipment" of the UL standard, and low illumination conditions, i.e., excitation for 24 hours at 25 lx, are regulated in ISO 15370:2001 "Ships and marine technology·Low-location lighting on passenger ships·Arrangement" of the ISO standard.

Further, in the above UL 924, afterglow luminance characteristics after 90 minutes' excitation under the above-described excitation condition are used as a decision criterion.

The present invention has been made in view of such a situation, and its object is to provide a phosphorescent phosphor having excellent afterglow luminance characteristics, even under the excitation condition of low illumination, compared to conventional strontium aluminate phosphorescent phosphors of the same type, and particularly a phosphorescent phosphor having excellent initial afterglow luminance characteristics and excellent afterglow luminance characteristics at 60 and 90 minutes after cessation of the excitation, and a method of manufacturing thereof.

Thus, in view of the above-described situation, the present inventor obtained a phosphorescent phosphor having excellent afterglow luminance characteristics compared to conventional strontium aluminate phosphorescent phosphors especially when excited under low illumination, by optimizing the amounts of europium (Eu) doped as an activator and dysprosium (Dy) doped as a co-activator, and further optimizing the composition ratio of strontium (Sr), barium (Ba), calcium (Ca) and aluminum (Al) as structural elements of a matrix in the strontium aluminate phosphorescent phosphor described in the above-described patent publication.

(1) First Invention

A phosphorescent phosphor according to a first invention of the present invention is a phosphorescent phosphor comprising a compound expressed by $MAl_2O_4$ as a matrix in which M comprises of strontium (Sr) and barium (Ba), wherein europium (Eu) is doped to the matrix as an activator, and dysprosium (Dy) is doped to the matrix as a co-activator, characterized in that an amount of the doped europium (Eu) is more than 1.5% and 5% in terms of mol % relative to a total mole number of the metal elements expressed by M, europium (Eu) and dysprosium (Dy), an amount of the doped dysprosium (Dy) ranges $0.3 \leq Dy/Eu \leq 2$ in terms of a molar ratio relative to europium (Eu), a ratio of aluminum (Al) ranges from 2.1 to 2.9 in terms of a molar ratio relative to the total mole number of the metal elements expressed by M, europium (Eu) and dysprosium (Dy), and a ratio of barium to M ranges $0.03 \leq Ba/(Sr+Ba) \leq 0.2$ in terms of a molar ratio.

Then, first of all, europium (Eu) is doped as an activator in the amount more than 1.5% and not more than 5% in terms of mol % relative to the total mole number of the metal elements expressed by M, europium (Eu) and dysprosium (Dy) and dysprosium (Dy) is doped as a co-activator in the amount of $0.3 \leq Dy/Eu \leq 2$ in terms of a molar ratio relative to europium (Eu), whereby the amount of doped europium contributing to fluorescent luminance characteristics or initial afterglow luminance characteristics is increased and optimized compared to the amount of doped dysprosium contributing to afterglow luminance characteristics. Therefore, initial afterglow luminance characteristics under the excitation condition of low illumination are improved, resulting in afterglow luminance characteristics superior to those of conventional phosphorescent phosphors.

Further, since the ratio of aluminum (Al) ranges from 2.1 to 2.9 in terms of a molar ratio relative to the total mole number of the metal elements expressed by M, europium (Eu) and dysprosium (Dy), a crystal structure is distorted to facilitate formation of a trap by making the ratio of aluminum greater than a stoichiometry ratio of 2.0, and therefore initial afterglow luminance characteristics under the excitation condition of low illumination are improved, resulting in afterglow luminance characteristics further superior to those of conventional phosphorescent phosphors.

Further, since the ratio of barium to M ranges $0.03 \leq Ba/(Sr+Ba) \leq 0.2$ in terms of a molar ratio, part of strontium is replaced by barium so that crystals are appropriately distorted, whereby initial afterglow luminance characteristics under the excitation condition of low illumination and afterglow luminance characteristics at 60 and 90 minutes after the cessation of excitation are improved, resulting in initial afterglow luminance characteristics superior to those of conventional phosphorescent phosphors.

Here, first of all, if the amount of doped europium as an activator is 1.5% or less in terms of mol % relative to the total mole number of the metal elements expressed by M, europium (Eu) and dysprosium (Dy), the amount of doped europium is so small that the initial afterglow luminance characteristics are inadequate equivalent to or inferior to those of conventional phosphorescent phosphors which is not preferable. Further, if the amount of doped europium as an activator is greater than 5%, the afterglow luminance decreases generally due to concentration quenching, and initial afterglow luminance characteristics under the excitation condition of low illumination deteriorate accordingly. Thus, the optimum doped amount of europium is more than 1.5% and not more than 5%.

Then, if the amount of doped dysprosium as a co-activator is less than 0.3 in terms of a molar ratio relative to europium, i.e., $Dy/Eu \leq 0.3$, the amount of doped dysprosium contributing to afterglow luminance characteristics is not sufficient relative to the amount of doped europium for obtaining excellent initial afterglow luminance characteristics, and therefore desirable initial afterglow luminance characteristics cannot be obtained. Moreover, if the amount of doped dysprosium is greater than 2 in terms of a molar ratio relative to europium, i.e., $2<Dy/Eu$, the amount of doped europium contributing to fluorescent luminance characteristics or initial afterglow luminance characteristics is not sufficient relative to the amount of doped dysprosium contributing to afterglow luminance characteristics, and therefore fluorescent luminance characteristics and initial afterglow luminance characteristics deteriorate and desirable initial afterglow luminance characteristics cannot be obtained.

Thus, the amount of doped europium as an activator is more than 1.5% and not more than 5% in terms of mol % relative to the total mole number of the metal elements expressed by M, europium (Eu) and dysprosium (Dy), and further the amount of dysprosium doped as a co-activator ranges $0.3 \leq Dy/Eu \langle 2$ in terms of a molar ratio relative to europium, whereby a phosphorescent phosphor having improved initial afterglow characteristics under the excitation condition of low illumination and hence having initial afterglow luminance characteristics superior to those of conventional phosphorescent phosphors can be obtained.

Moreover, if the ratio of aluminum (Al) is less than 2.1 in terms of a molar ratio relative to the total mole number of the metal elements expressed by M, europium (Eu) and dysprosium (Dy),i.e., $Al/(M+Eu+Dy)<2.1$, the ratio of aluminum is almost equal to or less than the stoichiometry ratio of 2.0, and therefore the afterglow luminance characteristics thereof are almost equivalent to or inferior to those of conventional phosphorescent phosphors. Moreover, if the ratio of aluminum (Al) is greater than 2.9 in terms of a molar ratio, i.e., $2.9<Al/(M+Eu+Dy)$, the occurrence ratio of by-products increases, and the luminance decreases accordingly, which is not preferable.

Thus, the ratio of aluminum (Al) ranges from 2.1 to 2.9 in a molar ratio relative to the total mole number of the metal elements expressed by M, europium (Eu) and dysprosium (Dy), whereby a phosphorescent phosphor having improved initial afterglow luminance characteristics under the excitation condition of low illumination and hence having afterglow luminance characteristics further superior to those of conventional phosphorescent phosphors can be obtained.

Further, if the ratio of barium is less than 0.03 in terms of a molar ratio relative to M, i.e., $Ba/(Sr+Ba)<0.03$, the ratio of barium is so small that crystals are hard to be appropriately distorted and thus no effect is produced. Moreover, if the ratio of barium is greater than 0.2, i.e., $0.2<Ba/(Sr+Ba)$, the ratio of strontium relatively decreases, so that the luminance decreases generally, which is not preferable.

Thus, the ratio of barium relative to M ranges $0.03 \leq Ba/(Sr+Ba) \leq 0.2$, whereby a phosphorescent phosphor having improved initial afterglow luminance characteristics under the excitation condition of low illumination and improved afterglow luminance characteristics at 60 and 90 minutes after cessation of the excitation and hence having afterglow luminance characteristics superior to those of conventional phosphorescent phosphors can be obtained.

According to the phosphorescent phosphor according to the first invention, the amount of doped europium contributing to fluorescent luminance characteristics or initial afterglow luminance characteristics is increased and optimized compared to the amount of doped dysprosium contributing to afterglow luminance characteristics, and the ratio of aluminum is made greater than the stoichiometry ratio of 2.0 so that a crystal structure is distorted, and part of strontium is replaced by barium so that crystals are appropriately distorted, and therefore afterglow luminance characteristics under the excitation condition of low illumination are improved and afterglow luminance characteristics at 60 and 90 minutes after cessation of the excitation are improved, thus making it possible to obtain afterglow luminance characteristics superior to those of conventional phosphorescent phosphors.

(2) Second Invention

A phosphorescent phosphor according to a second invention of the present invention is a phosphorescent phosphor comprising a compound expressed by $MAl_2O_4$ as a matrix in which M comprises of strontium (Sr) and calcium (Ca), wherein europium (Eu) is doped to the matrix as an activator, and dysprosium (Dy) is doped to the matrix as a co-activator, characterized in that an amount of the doped europium (Eu) is more than 1.5% and not more than 5% in terms of mol % relative to a total mole number of the metal elements expressed by M, europium (Eu) and dysprosium (Dy), an amount of the doped dysprosium (Dy) ranges $0.3 \leq Dy/Eu \leq 2$ in terms of a molar ratio relative to europium (Eu), a ratio of aluminum (Al) ranges from 2.1 to 2.9 in terms of a molar ratio relative to the total mole number of the metal elements expressed by M, europium (Eu) and dysprosium (Dy), and a ratio of calcium to M ranges $0.005 \leq Ca/(Sr+Ca) \leq 0.1$ in terms of a molar ratio.

Then, first of all, europium (Eu) is doped as an activator in the amount more than 1.5% and not more than 5% in terms of mol % relative to the total mole number of the metal elements expressed by M, europium (Eu) and dysprosium (Dy) and dysprosium (Dy) is doped as a co-activator in the amount of $0.3 \leq Dy/Eu \leq 2$ in terms of a molar ratio relative to europium (Eu), whereby the amount of doped europium contributing to fluorescent luminance characteristics or initial afterglow luminance characteristics is increased and optimized compared to the amount of doped dysprosium contributing to afterglow luminance characteristics, whereby initial afterglow luminance characteristics under the excitation condition of low illumination are improved, resulting in afterglow luminance characteristics superior to those of conventional phosphorescent phosphors.

Further, since the ratio of aluminum (Al) ranges from 2.1 to 2.9 in terms of a molar ratio relative to the total mole number of the metal elements expressed by M, europium (Eu) and dysprosium (Dy), a crystal structure is distorted to facilitate formation of a trap because the ratio of aluminum is greater than a stoichiometry ratio of 2.0, and therefore initial afterglow luminance characteristics under the excitation condition of low illumination are improved, resulting in afterglow luminance characteristics further superior to those of conventional phosphorescent phosphors.

Further, since the ratio of calcium to M ranges $0.005 \leq Ca/(Sr+Ca) \leq 0.1$ in terms of a molar ratio, part of strontium is replaced by calcium so that crystals are appropriately distorted, whereby initial afterglow luminance characteristics and the like under the excitation condition of low illumination are improved, resulting in initial afterglow luminance characteristics superior to those of conventional phosphorescent phosphors.

Here, first of all, if the amount of doped europium as an activator is 1.5% or less in terms of mol % relative to the total mole number of the metal elements expressed by M, europium (Eu) and dysprosium (Dy), the amount of doped europium is so small that the initial afterglow luminance characteristics are inadequate, and hence equivalent to or inferior to those of conventional phosphorescent phosphors, which is not preferable. Further, if the amount of doped europium as an activator is greater than 5%, the afterglow luminance decreases generally due to concentration quenching, and initial afterglow luminance characteristics under the excitation condition of low illumination deteriorate accordingly. Thus, the optimum doped amount of europium is more than 1.5% and not more than 5%.

Then, if the amount of doped dysprosium as a co-activator is less than 0.3 in terms of a molar ratio relative to europium, i.e., Dy/Eu<0.3, the amount of doped dysprosium contributing to afterglow luminance characteristics is not sufficient relative to the amount of doped europium for obtaining excellent initial afterglow luminance characteristics, and therefore desirable initial afterglow luminance characteristics cannot be obtained. Moreover, if the amount of doped dysprosium is greater than 2 in terms of a molar ratio relative to europium, i.e., 2<Dy/Eu, the amount of doped europium contributing to fluorescent luminance characteristics or initial afterglow luminance characteristics is not sufficient relative to the amount of doped dysprosium contributing to afterglow luminance characteristics, and therefore fluorescent luminance characteristics and initial afterglow luminance characteristics deteriorate and desirable initial afterglow luminance characteristics cannot be obtained.

Thus, the amount of doped europium as an activator is more than 1.5% and not more than 5% in terms of mol % relative to the total mole number of the metal elements expressed by M, europium (Eu) and dysprosium (Dy), and further the amount of dysprosium doped as a co-activator ranges $0.3 \leq Dy/Eu \leq 2$ in terms of a molar ratio relative to europium, whereby a phosphorescent phosphor having improved initial afterglow characteristics under the excitation condition of low illumination and hence having initial afterglow luminance characteristics superior to those of conventional phosphorescent phosphors can be obtained.

Moreover, if the ratio of aluminum (Al) is less than 2.1 in terms of a molar ratio relative to the total mole number of the metal elements expressed by M, europium (Eu) and dysprosium (Dy), i.e., Al/(M+Eu+Dy)<2.1, the ratio of aluminum is almost equal to or less than the stoichiometry ratio of 2.0, and therefore the afterglow luminance characteristics thereof are almost equivalent to or inferior to those of conventional phosphorescent phosphors. Moreover, if the ratio of aluminum (Al) is greater than 2.9 in terms of a molar ratio, i.e., 2.9<Al/(M+Eu+Dy), the occurrence ratio of by-products increases, and the luminance decreases accordingly, which is not preferable.

Thus, the ratio of aluminum (Al) ranges from 2.1 to 2.9 in a molar ratio relative to the total mole number of the metal elements expressed by M, europium (Eu) and dysprosium (Dy), whereby a phosphorescent phosphor having improved initial afterglow luminance characteristics under the excitation condition of low illumination and hence having afterglow luminance characteristics further superior to those of conventional phosphorescent phosphors can be obtained.

Further, if the ratio of calcium is less than 0.005 in terms of a molar ratio relative to M, i.e., Ca/(Sr+Ca)<0.005, the ratio of calcium is so small that crystals are hard to be appropriately distorted and thus no effect is produced. Moreover, if the ratio of calcium is greater than 0.1, i.e., 0.1<Ca/(Sr+Ca), calcium aluminate ($CaAl_2O_4$) or the like occurs as a by-product and the ratio of strontium relatively decreases, so that the luminance decreases generally, which is not preferable.

Thus, the ratio of calcium relative to M ranges $0.005 \leq Ca/(Sr+Ca) \leq 0.1$, whereby a phosphorescent phosphor having improved initial afterglow luminance characteristics under the excitation condition of low illumination and the like, and hence having afterglow luminance characteristics superior to those of conventional phosphorescent phosphors can be obtained.

According to the phosphorescent phosphor according to the second invention, the amount of doped europium contributing to fluorescent luminance characteristics or initial afterglow luminance characteristics is increased and optimized compared to the amount of doped dysprosium contributing to afterglow luminance characteristics, and the ratio of aluminum is made greater than the stoichiometry ratio of 2.0 so that a crystal structure is distorted, and part of strontium is replaced by barium so that crystals are appropriately distorted, and therefore afterglow luminance characteristics and the like under the excitation condition of low illumination are improved, thus making it possible to obtain afterglow luminance characteristics superior to those of conventional phosphorescent phosphors.

(3) Third Invention

A phosphorescent phosphor according to a third invention of the present invention is a phosphorescent phosphor comprising a compound expressed by $MAl_2O_4$ as a matrix in which M comprises of strontium (Sr), barium (Ba) and calcium (Ca), wherein europium (Eu) is doped to the matrix as an activator, and dysprosium (Dy) is doped to the matrix as a co-activator, characterized in that an amount of the doped europium (Eu) is more than 1.5% and not more than 5% in terms of mol % relative to a total mole number of the metal elements expressed by M, europium (Eu) and dysprosium (Dy), an amount of the doped dysprosium (Dy) ranges $0.3 \leq Dy/Eu \leq 2$ in terms of a molar ratio relative to europium (Eu), a ratio of aluminum (Al) ranges from 2.1 to 2.9 in terms of a molar ratio relative to the total mole number of the metal elements expressed by M, europium (Eu) and dysprosium (Dy), a ratio of barium to M ranges $0.03 \leq Ba/(Sr+Ba+Ca) \leq 0.145$ in terms of a molar ratio, a ratio of calcium to M ranges $0.005 \leq Ca/(Sr+Ba+Ca) \leq 0.05$ in terms of a molar ratio, and a total ratio of barium and calcium to M ranges $0.035 \leq (Ba+Ca)/(Sr+Ba+Ca) \leq 0.15$ in terms of a molar ratio.

Then, first of all, europium (Eu) is doped as an activator in the amount more than 1.5% and not more than 5% in terms of mol % relative to the total mole number of the metal elements expressed by M, europium (Eu) and dysprosium (Dy) and dysprosium (Dy) is doped as a co-activator in the amount of $0.3 \leq Dy/Eu \leq 2$ in terms of a molar ratio relative to europium (Eu), whereby the amount of doped europium contributing to fluorescent luminance characteristics or initial afterglow luminance characteristics is increased and optimized compared to the amount of doped dysprosium contributing to afterglow luminance characteristics, whereby initial afterglow luminance characteristics under the excitation condition of low illumination are improved, resulting in afterglow luminance characteristics superior to those of conventional phosphorescent phosphors.

Further, since the ratio of aluminum (Al) ranges from 2.1 to 2.9 in terms of a molar ratio relative to the total mole number of the metal elements expressed by M, europium (Eu) and dysprosium (Dy), a crystal structure is distorted to facilitate formation of a trap because the ratio of aluminum is greater than a stoichiometry ratio of 2.0, and therefore initial afterglow luminance characteristics under the excitation condition of low illumination are improved, resulting in afterglow luminance characteristics further superior to those of conventional phosphorescent phosphors.

Further, since the ratio of barium to M ranges $0.03 \leq Ba/(Sr+Ba+Ca) \leq 0.145$ in terms of a molar ratio, the ratio of calcium to M ranges $0.005 \leq Ca/(Sr+Ba+Ca) \leq 0.05$ in terms of a molar ratio, and the total ratio of barium and calcium to M ranges $0.035 \leq (Ba+Ca)/(Sr+Ba+Ca) \leq 0.15$ in terms of a molar ratio, part of strontium is replaced by calcium so that crystals are appropriately distorted, whereby initial afterglow luminance characteristics under the excitation condition of low illumination are improved, resulting in initial afterglow luminance characteristics superior to those of conventional phosphorescent phosphors.

Here, first of all, if the amount of doped europium as an activator is 1.5% or less in terms of mol % relative to the total mole number of the metal elements expressed by M, europium (Eu) and dysprosium (Dy), the amount of doped europium is so small that the initial afterglow luminance characteristics are inadequate, and hence equivalent to or inferior to those of conventional phosphorescent phosphors, which is not preferable. Further, if the amount of doped europium as an activator is greater than 5%, the afterglow luminance decreases generally due to concentration quenching, and initial afterglow luminance characteristics under the excitation condition of low illumination deteriorate accordingly. Thus, the optimum doped amount ranges from more than 1.5% to not more than 5%.

Then, if the amount of doped dysprosium as a co-activator is less than 0.3 in terms of a molar ratio relative to europium, i.e., Dy/Eu<0.3, the amount of doped dysprosium contributing to afterglow luminance characteristics is not sufficient relative to the amount of doped europium for obtaining excellent initial afterglow luminance characteristics, and therefore desirable initial afterglow luminance characteristics cannot be obtained. Moreover, if the amount of doped dysprosium is greater than 2 in terms of a molar ratio relative to europium, i.e., 2<Dy/Eu, the amount of doped europium contributing to fluorescent luminance characteristics or initial afterglow luminance characteristics is not sufficient relative to the amount of doped dysprosium contributing to afterglow luminance characteristics, and therefore fluorescent luminance characteristics and initial afterglow luminance characteristics deteriorate and desirable initial afterglow luminance characteristics cannot be obtained.

Thus, the amount of doped europium as an activator is more than 1.5% and not more than 5% in terms of mol % relative to the total mole number of the metal elements expressed by M, europium (Eu) and dysprosium (Dy), and further the amount of dysprosium doped as a co-activator ranges $0.3 \leq Dy/Eu \leq 2$ in terms of a molar ratio relative to europium, whereby a phosphorescent phosphor having improved initial afterglow characteristics under the excitation condition of low illumination and hence having initial afterglow luminance characteristics superior to those of conventional phosphorescent phosphors can be obtained.

Moreover, if the ratio of aluminum (Al) is less than 2.1 in terms of a molar ratio relative to the total mole number of the metal elements expressed by M, europium (Eu) and dysprosium (Dy), i.e., Al/(M+Eu+Dy)<2.1, the ratio of aluminum is almost equal to or less than the stoichiometry ratio of 2.0, and therefore the afterglow characteristics thereof are almost equivalent to or inferior to those of conventional phosphorescent phosphors. Moreover, if the ratio of aluminum (Al) is greater than 2.9 in terms of a molar ratio, i.e., 2.9<Al/(M+Eu+Dy), the occurrence ratio of by-products increases, and the luminance decreases accordingly, which is not preferable.

Thus, the ratio of aluminum (Al) ranges from 2.1 to 2.9 in a molar ratio relative to the total mole number of the metal elements expressed by M, europium (Eu) and dysprosium (Dy), whereby a phosphorescent phosphor having improved initial afterglow luminance characteristics under the excitation condition of low illumination and hence having afterglow luminance characteristics further superior to those of conventional phosphorescent phosphors can be obtained.

Further, if the ratio of barium to M is less than 0.03 in terms of a molar ratio, i.e., Ba/(Sr+Ba+Ca)<0.03, the ratio of barium is so small that crystals are hard to be distorted appropriately and thus no effect is produced. Likewise, if the ratio of calcium to M is less than 0.005, i.e., Ca/(Sr+Ba+Ca)<0.005, no effect is produced by calcium. Moreover, the ratio of calcium to M is greater than 0.05, i.e., 0.05<Ca/(Sr+Ba+Ca), calcium aluminate ($CaAl_2O_4$) or the like occurs as a by-product, so that the luminance decreases generally, which is not preferable.

In addition to the aforementioned conditions, moreover, if the total molar ratio of barium and calcium to M is greater than 0.15, i.e., 0.15<(Ba+Ca)/(Sr+Ba+Ca), the ratio of strontium relatively decreases, so that the luminance decreases generally, which is not preferable.

Thus, the ratio of barium to M ranges $0.03 \leq Ba/(Sr+Ba+Ca) \leq 0.145$ in terms of a molar ratio, the ratio of calcium to M ranges $0.005 \leq Ca/(Sr+Ba+Ca) \leq 0.05$ in terms of a molar ratio, and the total ratio of barium and calcium to M ranges $0.035 \leq (Ba+Ca)/(Sr+Ba+Ca) \leq 0.15$, whereby a phosphorescent phosphor having improved initial afterglow luminance characteristics and the like under the excitation condition of low illumination and hence having afterglow luminance characteristics superior to those of conventional phosphorescent phosphors can be obtained.

According to the phosphorescent phosphor according to the third invention, the amount of doped europium contributing to fluorescent luminance characteristics or initial afterglow luminance characteristics is increased and optimized compared to the amount of doped dysprosium contributing to afterglow luminance characteristics, and the ratio of aluminum is made greater than the stoichiometry ratio of 2.0 so that a crystal structure is distorted, and part of strontium is replaced by barium and calcium so that crystals are appropriately distorted, and therefore afterglow luminance characteristics and the like under the excitation condition of low illumination are improved, thus making it possible to obtain afterglow luminance characteristics superior to those of conventional phosphorescent phosphors.

(4) Fourth Invention

A method of manufacturing an alkaline-earth metal aluminate phosphorescent phosphor according to a fourth invention of the present invention is characterized in that an aluminum (Al) compound, a strontium (Sr) compound, a barium (Ba) compound, a europium (Eu) compound and a dysprosium (Dy) compound are mixed so that molar ratios of the elements meet following requirements:

$0.015 < Eu/(Sr+Ba+Eu+Dy) \leq 0.05$, $0.3 \leq Dy/Eu \leq 2$, $0.03 \leq Ba/(Sr+Ba) \leq 0.2$ and $2.1 \leq Al/(Sr+Ba+Eu+Dy) \leq 2.9$, and a resultant mixture is fired in a reductive atmosphere, and then cooled and ground.

According to the method of manufacturing an alkaline-earth metal aluminate phosphorescent phosphor according to the fourth invention, an alkaline-earth metal aluminate phosphorescent phosphor having improved initial afterglow luminance characteristics under the excitation condition of low illumination and hence having afterglow luminance characteristics superior to those of conventional phosphorescent phosphors can be manufactured.

(5) Fifth Invention

A method of manufacturing an alkaline-earth metal aluminate phosphorescent phosphor according to a fifth invention of the present invention is characterized in that an aluminum (Al) compound, a strontium (Sr) compound, a calcium (Ca) compound, a europium (Eu) compound and a dysprosium (Dy) compound are mixed so that molar ratios of the elements meet following requirements:

$0.015 < Eu/(Sr+Ca+Eu+Dy) \leq 0.05$, $0.3 \leq Dy/Eu \leq 2$, $0.005 \leq Ca/(Sr+Ca) \leq 0.1$ and $2.1 \leq Al/(Sr+Ca+Eu+Dy) \leq 2.9$, and a resultant mixture is fired in a reductive atmosphere, and then cooled and ground.

According to the method of manufacturing an alkaline-earth metal aluminate phosphorescent phosphor according to the fifth invention, an alkaline-earth metal aluminate phosphorescent phosphor having improved initial afterglow luminance characteristics under low-illuminance excitation conditions the excitation condition of low illumination and hence having afterglow luminance characteristics superior to those of conventional phosphorescent phosphors can be manufactured.

(6) Sixth Invention

A method of manufacturing an alkaline-earth metal aluminate phosphorescent phosphor according to a sixth invention of the present invention is characterized in that an aluminum (Al) compound, a strontium (Sr) compound, a barium (Ba) compound, a calcium (Ca) compound, a europium (Eu) compound and a dysprosium (Dy) compound are mixed so that molar ratios of the elements meet following requirements:

$0.015 < Eu/(Sr+Ba+Ca+Eu+Dy) \leq 0.05$, $0.3 \leq Dy/Eu \leq 2$, $0.03 \leq Ba/(Sr+Ba+Ca) \leq 0.145$, $0.005 \leq Ca/(Sr+Ba+Ca) \leq 0.05$, $0.035 \leq (Ba+Ca)/(Sr+Ba+Ca) \leq 0.15$ and $2.1 \leq Al/(Sr+Ba+Ca+Eu+Dy) \leq 2.9$, and a resultant mixture is fired in a reductive atmosphere, and then cooled and ground.

According to the method of manufacturing an alkaline-earth metal aluminate phosphorescent phosphor according to the sixth invention, an alkaline-earth metal aluminate phosphorescent phosphor having improved initial afterglow luminance characteristics under low-illuminance excitation conditions and hence having afterglow luminance characteristics superior to those of conventional phosphorescent phosphors can be manufactured.

(7) Seventh Invention

A method of manufacturing an alkaline-earth metal aluminate phosphorescent phosphor according to a seventh invention of the present invention is the method of manufacturing an alkaline-earth metal aluminate phosphorescent phosphor according to the above-described fourth, fifth or sixth invention, characterized in that a boron compound as flux is added to a raw material and the resultant mixture is fired. Then, by adding a boron as flux compound to a raw material and firing the resultant mixture, an excellent alkaline-earth metal element aluminate phosphorescent phosphor can be manufactured at even a low firing temperature. Furthermore, boric acid (H3BO3) is suitably used as the boron compound, but any boron compound other than boric acid brings about a similar effect. Moreover, the amount of boron compound to be added is preferably about 0.01 to 10%, more preferably about 0.5 to 3% of the total mass of raw material.

Here, if the amount of boron compound to be added is greater than 10% of the total mass of raw material, the fired material is tightly sintered, and therefore grinding becomes difficult and the luminance decreases due to grinding. Therefore, the amount of boron compound to be added is preferably 0.01 to 10% of the total mass of raw material.

According to the method of manufacturing an alkaline-earth metal aluminate phosphorescent phosphor according to the seventh invention, an excellent alkaline-earth metal element aluminate phosphorescent phosphor can be manufactured at even a low firing temperature in the method of manufacturing an alkaline-earth metal aluminate phosphorescent phosphor according to the fourth, fifth or sixth invention.

BEST MODE FOR CARRYING OUT THE INVENTION

Figure 1:
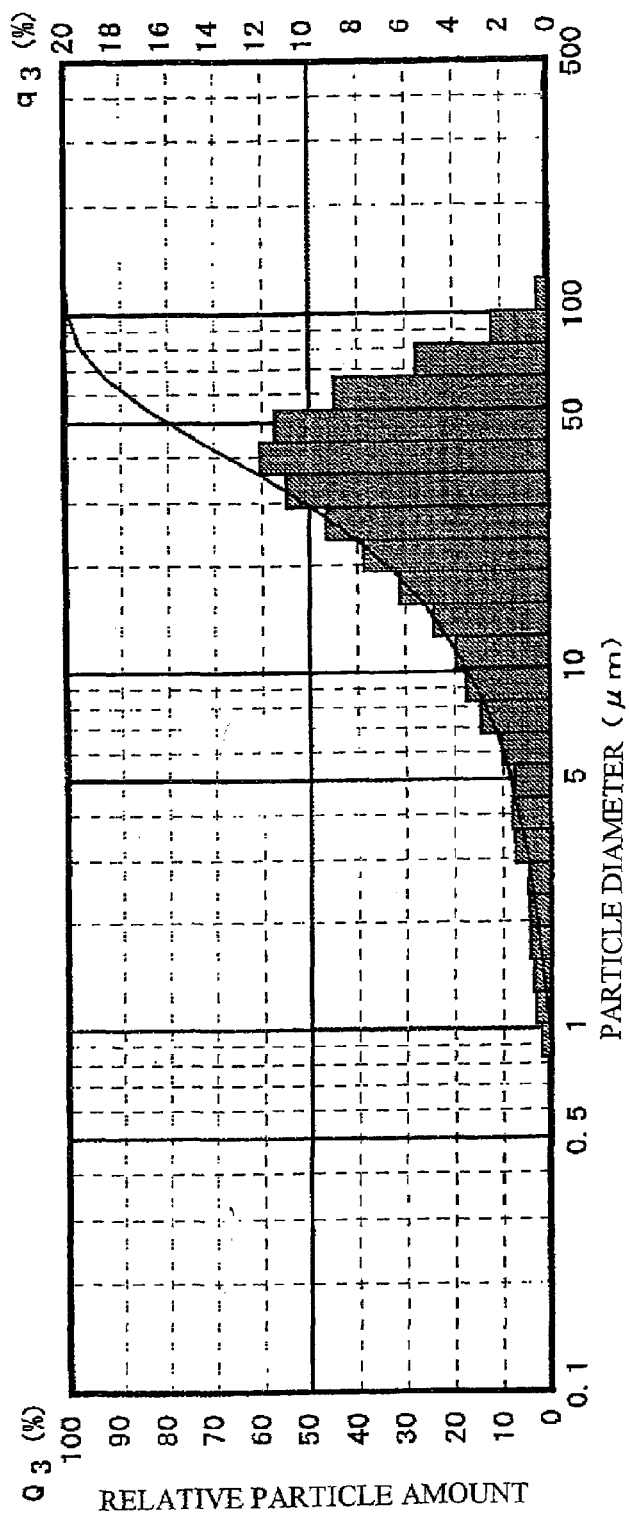
FIG. 1 shows particle size distribution of Sample 1-(4).

Steps of manufacturing a phosphorescent phosphor in one embodiment of the present invention will be described below.

First, to strontium carbonate ($SrCO_3$), barium carbonate ($BaCO_3$) and calcium carbonate ($CaCO_3$) as raw materials of strontium (Sr), barium (Ba) and calcium (Ca), respectively, as metal elements expressed by M, europium oxide ($Eu_2O_3$) as a raw material of europium (Eu) as an activator is doped, and dysprosium oxide ($Dy_2O_3$) as a raw material of dysprosium (Dy) as a co-activator is also doped. An amount of europium (Eu) doped at this time is more than 1.5% and not more than 5% in terms of mol % relative to a total mole number of the metal elements expressed by M, europium and dysprosium, and an amount of dysprosium (Dy) doped ranges from 0.3 to 2 in terms of a molar ratio relative to europium (Eu). Further, as a raw material of aluminum (Al), alumina ($Al_2O_3$) is added so that a molar ratio of aluminum ranges from 2.1 to 2.9 relative to the total mole number of strontium, barium, calcium, europium and dysprosium, boric acid ($H_3BO_3$), e.g., is added thereto as a boron compound as flux in an amount of about 0.01 to 10% relative to the total mass of raw material, and a resultant mixture is sufficiently mixed using a ball mill or the like. This mixture is fired at a firing temperature of, for example, about 1300° C. to 1500° C. for about 1 to 6 hours in a reductive atmosphere, e.g., in a stream of nitrogen-hydrogen mixture gas, and then cooled to room temperature for 1 to 6 hours. The material obtained from the firing is ground and sieved to obtain a phosphorescent phosphor having a predetermined particle diameter.

Furthermore, at this time, the amount of europium (Eu) doped as an activator is expressed in terms of mol % relative to the total mole number of the metal elements M, europium (Eu) as an activator and dysprosium (Dy) as a co-activator. For example, when the metal elements expressed by M comprise strontium and barium, providing that the molar ratio of barium relative to the total mole number of strontium and barium is 0.1, that 3 mol % of europium is doped and that 1.5 mol % of dysprosium is doped, compounds of the elements are blended so that the amount of strontium element is 0.8595 mol, that the amount of barium element is 0.0955 mol, that the amount of europium element 0.03 mol and that the amount of dysprosium element is 0.015 mol. Consequently, relative to the total mole number of the elements (i.e., 1), the amount of europium is 3% in terms of mol %, the amount of dysprosium is 1.5% in terms of a molar ratio, and the molar ratio of barium to the total mole number of strontium and barium is 0.1.

Moreover, in the aforementioned embodiment, the firing process is performed using a boron compound as flux. However, as long as the firing temperature is sufficiently high, e.g., about 1450° C., compared to a temperature required for the reaction, the firing process may be performed without flux. In this case, sinter of the material obtained from firing is so weak that its grinding becomes easy, thus making it possible to alleviate a luminance decrease by grinding.

Furthermore, metal elements expressed by M may comprise substantially either of strontium and barium, of strontium and calcium, or of strontium, barium and calcium. Even if a slight amount of other elements than these ones are included, that will be also included in the scope of the present invention.

(1) EXAMPLE 1

An example of the above-mentioned embodiment where the metal elements expressed by M comprises of strontium (Sr) and barium (Ba) will now be described.

First, a relation between the doped amounts of europium (Eu) and dysprosium (Dy) and initial afterglow luminance characteristics will be described.

First, as a raw material of barium (Ba), 19.14 g (0.097 mol) of barium carbonate ($BaCO_3$) is added to 128.88 g (0.873 mol) of strontium carbonate ($SrCO_3$) as a raw material of strontium (Sr), 3.52 g (0.02 mol as Eu) of europium oxide ($Eu_2O_3$) as a raw material of europium as an activator is doped, 1.86 g (0.01 mol as Dy) of dysprosium oxide ($Dy_2O_3$) as a raw material of dysprosium (Dy) as a co-activator is doped, 117.26 g (2.3 mol as Al, i.e., Al/(Sr+Eu+Dy)=2.3) of alumina ($Al_2O_3$) as an aluminum raw material is added thereto, 3.2 g (i.e., 1.2% by mass relative to the raw material) of boric acid ($H_3BO_3$) is added thereto as a boron (B) compound as flux, and a resultant mixture is sufficiently mixed using a ball mill. This mixture is fired at a firing temperature of 1350° C. for 4 hours in a stream of mixture gas of 97% of nitrogen and 3% of hydrogen as a reductive atmosphere, and then cooled to room temperature for about an hour. The fired material obtained was ground and sieved, and a resultant powder passing through a #250 mesh was determined to be phosphorescent phosphor Sample 1-(3). This Sample 1-(3) comprises of 0.873 mol of strontium and 0.097 mol of barium, wherein the molar ratio of strontium relative to the total mole number of strontium and barium (0.97 mol) is 0.9, and the molar ratio of barium is 0.1. Further, the amount of europium relative to the total amount of strontium, barium, europium and dysprosium is 2 mol %, the amount of dysprosium is similarly 1 mol %, and the molar ratio of dysprosium to europium, i.e., Dy/Eu, is 0.5. Moreover, the molar ratio of aluminum, i.e., Al/(Sr+Eu+Dy), is 2.3, which exceeds a stoichiometry ratio of 2.0.

Likewise, the molar ratio of dysprosium relative to europium, i.e., Dy/Eu, was fixed to 0.5, and the amount of doped europium relative to the total mole number of strontium (Sr), barium (Ba), europium (Eu) and dysprosium (Dy) was varied within the range from 0.01 to 0.07 as shown in Table 1 to obtain phosphorescent phosphors as Sample 1-(1), Sample 1-(2), and Samples 1-(4) to 1-(6), respectively. Further, for a Comparative Example, as a conventional aluminate phosphorescent phosphor, the phosphorescent phosphor "N-Yako/LumiNova®" G-300M (Lot No. DM-092, NEMOTO & CO., LTD) that is one of the embodiments of the patent document 1 was employed as Comparative Example 1. Furthermore, for Sample 1-(4), the particle size distribution was measured by Shimadzu Laser Diffraction Particle Size Analyzer (SALD-2100, Shimadzu Co., Ltd.). The result thereof is shown in FIG. 1.

TABLE 1

| | Conditions M = Sr + Ba (Sr = 0.9, Ba = 0.1) (M + Eu + Dy) = 1 mol Al/(M + Eu + Dy) = 2.3 | | |
|---|---|---|---|
| Samples | Eu/(M + Eu + Dy) (molar ratio) | Dy/(M + Eu + Dy) (molar ratio) | Dy/Eu |
| Sample 1-(1) | 0.01 | 0.005 | 0.5 |
| Sample 1-(2) | 0.015 | 0.0075 | 0.5 |
| Sample 1-(3) | 0.02 | 0.01 | 0.5 |
| Sample 1-(4) | 0.03 | 0.015 | 0.5 |
| Sample 1-(5) | 0.05 | 0.025 | 0.5 |
| Sample 1-(6) | 0.07 | 0.035 | 0.5 |

Next, the afterglow luminance characteristics of these Samples 1-(1) to 1-(6) and Comparative Example 1 were examined. Each sample powder was filled in a sample container made of aluminum, heated in advance at 120° C. for about 2 hours in a dark place to remove afterglow, and then excited by a fluorescent lamp with a color temperature of 4200 K for 60 minutes at a brightness of 54 lx, i.e., under the excitation condition of low illumination, and thereafter the afterglow was measured using a luminance meter (chromaticity luminance meter BM-5A, TOPCON CORPORATION). The results thereof are shown in Table 2 as relative luminance where the afterglow luminance of Comparative Example 1 is assumed to be 1.

TABLE 2

Excitation conditions
FL (4200 K), 54 lx, 60 minutes
Afterglow luminance characteristics (relative values where the value of Comparative Example 1 is 1.0)

| Samples | 5 minutes | 10 minutes | 20 minutes | 60 minutes | 90 minutes |
|---|---|---|---|---|---|
| Comparative Example 1 | 1.00 | 1.00 | 1.00 | 1.00 | 1.00 |
| Sample 1-(1) | 1.62 | 1.70 | 1.74 | 1.93 | 1.85 |
| Sample 1-(2) | 1.82 | 1.89 | 1.96 | 2.19 | 1.94 |
| Sample 1-(3) | 1.89 | 1.98 | 2.09 | 2.48 | 2.53 |
| Sample 1-(4) | 2.00 | 2.12 | 2.23 | 2.76 | 2.81 |
| Sample 1-(5) | 1.89 | 1.98 | 2.09 | 2.48 | 2.53 |
| Sample 1-(6) | 1.69 | 1.57 | 1.43 | 1.52 | 1.23 |

From the results shown in Table 2, it is apparent that in all of Samples 1-(3) to 1-(5), i.e., in the condition in which the amount of doped europium is 2 to 5 mol %, the afterglow luminance characteristics, particularly the initial afterglow luminance characteristics at 5 minutes after cessation of the excitation, are excellent showing more than about 1.7 times as high as that of Comparative Example 1, and the afterglow luminance characteristics at 90 minutes are excellent showing more than about 2 times as high as that of Comparative Example 1. Further, in Sample 1-(4), i.e., in the condition in which the amount of doped europium is 3 mol %, the afterglow luminance characteristics at 5 minutes is 2 times as high as that of Comparative Example 1, and the afterglow luminance characteristics at 90 minutes is 2.81 times as high as that of Comparative Example 1, and thus it is apparent that Sample 1-(4) has more preferable excellent afterglow luminance characteristics.

However, in Sample 1-(6), i.e., in the condition in which the amount of doped europium is 7 mol %, i.e., greater than 5%, the luminance decreases generally due to concentration quenching, and particularly the afterglow luminance characteristics at 90 minutes after cessation of the excitation is only about 1.23 times as high as that of Comparative Example 1.

Moreover, in Sample 1-(2), i.e., in the condition in which the amount of doped europium is 1.5 mol %, though the afterglow luminance characteristics at 5 minutes after cessation of the excitation is preferable showing 1.82 times as high as that of Comparative Example 1, the afterglow luminance characteristics at 90 minutes is 1.94 times as high as Comparative Example 1, slightly lower than an expected value of 2.

Further, in Sample 1-(1), i.e., in the condition in which the amount of doped europium is 1 mol %, the luminance decreases generally.

From these results, it is apparent that when the ratio of dysprosium to europium is fixed to 0.5 in the case of excitation under the excitation condition of low illumination, afterglow luminance characteristics superior to those of the conventional examples are obtained if the amount of doped europium ranges from more than 1.5 mol % to not more than 5 mol %.

The change of initial afterglow luminance characteristics as the ratio of the amounts of doped dysprosium and europium (Dy/Eu) is varied will now be described.

Principally in the condition for Sample 1-(4) which is considered preferable from the results shown in Table 2, i.e., in the condition in which the amount of doped europium relative to the total amount of strontium, barium, europium and dysprosium is 3 mol %, and the ratio of dysprosium to europium (Dy/Eu) is 0.5, phosphorescent phosphors were prepared as Samples 1-(7) to 1-(14) under the same conditions as those for Sample 1-(3) except that the amount of doped europium was fixed to 3 mol % and that the value of Dy/Eu was varied within the range of 0.1 to 2.5 as shown in Table 3.

TABLE 3

M = Sr + Ba (Sr = 0.9, Ba = 0.1)
(M + Eu + Dy) = 1 mol
Al/(M + Eu + Dy) = 2.3

| Samples | Eu/(M + Eu + Dy) (molar ratio) | Dy/(M + Eu + Dy) (molar ratio) | Dy/Eu |
|---|---|---|---|
| Sample 1-(7) | 0.03 | 0.003 | 0.1 |
| Sample 1-(8) | 0.03 | 0.006 | 0.2 |
| Sample 1-(9) | 0.03 | 0.009 | 0.3 |
| Sample 1-(10) | 0.03 | 0.012 | 0.4 |
| Sample 1-(4) | 0.03 | 0.015 | 0.5 |
| Sample 1-(11) | 0.03 | 0.03 | 1 |
| Sample 1-(12) | 0.03 | 0.045 | 1.5 |
| Sample 1-(13) | 0.03 | 0.06 | 2 |
| Sample 1-(14) | 0.03 | 0.075 | 2.5 |

These Samples 1-(7) to 1-(14) were excited under the excitation condition of low illumination (4200 K fluorescent lamp, 54 lx, 60 minutes) in the same manner as described for Sample 1-(1), and their afterglow luminance characteristics were examined. The results thereof, as well as the results for Comparative Example 1 and Sample 1-(4), are shown in Table 4 as relative luminance where the afterglow luminance of Comparative Example 1 assumed to be 1.

TABLE 4

Excitation conditions
FL (4200 K), 54 lx, 60 minutes
Afterglow luminance characteristics (relative values where the value of Comparative Example 1 is 1.0)

| Samples | 5 minutes | 10 minutes | 20 minutes | 60 minutes | 90 minutes |
|---|---|---|---|---|---|
| Comparative Example 1 | 1.00 | 1.00 | 1.00 | 1.00 | 1.00 |
| Sample 1-(7) | 1.49 | 1.38 | 1.27 | 1.17 | 1.04 |
| Sample 1-(8) | 1.65 | 1.51 | 1.49 | 1.52 | 1.30 |
| Sample 1-(9) | 1.75 | 1.78 | 1.83 | 2.10 | 2.01 |
| Sample 1-(10) | 1.87 | 1.95 | 2.09 | 2.52 | 2.60 |
| Sample 1-(4) | 2.00 | 2.12 | 2.23 | 2.76 | 2.81 |
| Sample 1-(11) | 1.95 | 2.06 | 2.19 | 2.59 | 2.81 |
| Sample 1-(12) | 1.93 | 2.04 | 2.17 | 2.62 | 2.79 |
| Sample 1-(13) | 1.95 | 2.06 | 2.19 | 2.59 | 2.81 |
| Sample 1-(14) | 1.52 | 1.64 | 1.72 | 2.02 | 2.08 |

From these results shown in Table 4, it is apparent that in all of Samples 1-(9) to 1-(13), i.e., where the ratio of dysprosium to europium ranges from 0.3 to 2, the afterglow luminance characteristics, particularly the initial afterglow luminance characteristics at 5 minutes after cessation of the excitation are excellent showing more than about 1.7 times as high as that of Comparative Example, and the afterglow luminance characteristics after 90 minutes are excellent showing more than about 2 times as high as that of Comparative Example 1. Further, in Samples 1-(4) and 1-(11) to 1-(13), i.e., where the ratio of dysprosium to europium ranges from 0.5 to 2, the afterglow luminance characteristics at 5 minutes are 1.9 or more times as high as that of Comparative Example 1, and the afterglow luminance characteristics after 90 minutes are approximately 2.8 times as high as that of Comparative Example 1, and thus it is apparent these Samples have more preferable excellent afterglow luminance characteristics. However, it is apparent that in Samples 1-(7) and 1-(8), i.e., where the ratio of dysprosium to europium ranges from 0.1 to 0.2, the amount of doped dysprosium contributing to afterglow luminance characteristics is so small compared to the amount of europium that the afterglow luminance characteristics deteriorate, and particularly the afterglow luminance at 90 minutes decreases. Moreover, in Sample 1-(14), i.e., where the ratio of dysprosium to europium is 2.5, the afterglow luminance characteristics at 90 minutes is 2 times or more as high as that of Comparative Example 1, but the amount of doped europium contributing to the fluorescent luminance and the initial afterglow luminance is small compared to the amount of dysprosium contributing to afterglow luminance characteristics, and therefore the initial afterglow luminance characteristics deteriorate.

From these results, it is apparent that when the amount of doped europium is fixed to 3 mol % in the case of excitation under the excitation condition of low illumination, afterglow luminance characteristics superior to those of the conventional examples are obtained if the ratio of dysprosium to europium (Dy/Eu) ranges from 0.3 to 2.0. Moreover, it was confirmed that a similar effect could be produced even if the amount of doped europium ranges from 1.5% to 5%.

Further, phosphorescent phosphors of Samples 1-(9), 1-(4) and 1-(13) considered preferable in the above measurements, i.e., where the amounts of doped europium were 3% each and the amounts of doped dysprosium were 0.9%, 1.5% and 6%, respectively, were not excited under the excitation condition of low illumination as Comparative Example 1, but excited at a brightness of 400 lx with a D65 standard light source for 20 minutes as an example under normal light conditions, and afterglow luminance characteristics were measured similarly. The results thereof are shown in Table 5 as relative luminance where the afterglow luminance of Comparative Example 1 assumed to be 1.

TABLE 5

| | Excitation conditions $D_{65}$ standard light source, 400 lx, 20 minutes Afterglow luminance characteristics (relative values where the value of Comparative Example 1 is 1.0) | | | | |
|---|---|---|---|---|---|
| Samples | 5 minutes | 10 minutes | 20 minutes | 60 minutes | 90 minutes |
| Comparative Example 1 | 1.00 | 1.00 | 1.00 | 1.00 | 1.00 |
| Sample 1-(9) | 1.12 | 0.98 | 0.90 | 0.81 | 0.86 |
| Sample 1-(4) | 1.39 | 1.39 | 1.37 | 1.36 | 1.34 |
| Sample 1-(13) | 1.38 | 1.42 | 1.41 | 1.43 | 1.42 |

As apparent from these results shown in Table 5, in Sample 1-(9), no improvement in afterglow luminance characteristics was recognized compared to Comparative Example 1 when the sample was excited at a brightness of 400 lx with the D65 standard light source for 20 minutes. Moreover, in Samples 1-(4) and 1-(13), an improvement in afterglow luminance characteristics was recognized compared to Comparative Example 1. However, since the effect is only 1.3 to 1.4 times as high as that of Comparative Example 1 in the afterglow luminance at 5 minutes and 90 minutes after cessation of the excitation, for example, that is limited to a slight effect compared to a remarkable effect that the afterglow luminance at 5 minutes after cessation of the excitation is about 2 times as high as that of Comparative Example 1 and that the afterglow luminance at 90 minutes after cessation of the excitation is about 2.8 times as high as that of Comparative Example 1 for the same samples excited under the excitation condition of low illumination (4200 K fluorescent lamp/54 lx/60 minutes) as shown in Table 4. From this fact, it is apparent that phosphorescent phosphors of Samples 1-(9), 1-(4) and 1-(13), at least, have more excellent afterglow luminance characteristics under the excitation condition of low illumination (e.g., 4200 K fluorescent lamp, 54 lx, 60 minutes) than under excitation conditions by normal light (e.g., D65 standard light source, 400 lx, 20 minutes). Likewise, under normal light excitation conditions, phosphorescent phosphors of Samples 1-(2), 1-(3) and 1-(10) to 1-(12) were checked, and resultantly found to have tendencies similar to those of Samples 1-(9), 1-(4) and 1-(13).

From the results of measurements of the afterglow luminance of Samples 1-(1) to 1-(14) described above, it is apparent that by doping europium (Eu) in the amount more than 1.5% and not more than 5% in terms of mol % relative to the total mole number of strontium (Sr), barium (Ba), europium (Eu) and dysprosium (Dy), and by doping dysprosium (Dy) in the ratio of $0.3 \leq Dy/Eu \leq 2$ in terms of a molar ratio relative to europium (Eu), the afterglow luminance characteristics, particularly the initial afterglow luminance characteristics and the afterglow luminance characteristics at 60 and 90 minutes after cessation of the excitation become superior to those of conventional phosphorescent phosphors particularly in the case of excitation under the excitation condition of low illumination, and thus a phosphorescent phosphor having unprecedented new characteristics is obtained.

In the case where the metal elements expressed by M comprise of strontium (Sr) and barium (Ba), the molar ratio of aluminum (Al) relative to the total mole number of the metal elements expressed by M, europium (Eu) and dysprosium (Dy) and the afterglow luminance characteristics will now be described.

As a raw material of barium (Ba), 18.85 g (0.0955 mol) of barium carbonate ($BaCO_3$) is added to 126.89 g (0.8595 mol) of strontium carbonate ($SrCO_3$) as a raw material of strontium (Sr), 5.28 g (0.03 mol as Eu) of europium oxide ($Eu_2O_3$) as a raw material of europium as an activator is doped, 2.80 g (0.015 mol as Dy) of dysprosium oxide ($Dy_2O_3$) as a raw material of dysprosium (Dy) as a co-activator is doped, 104.51 g (2.05 mol as Al, i.e., Al/(Sr+Ba+Eu+Dy)=2.05) of alumina ($Al_2O_3$) as an aluminum raw material is added, 3.1 g (i.e., 1.2% by mass relative to the raw material) of boric acid ($H_3BO_3$) as a boron (B) compound as flux is added, and a resultant mixture is sufficiently mixed using a ball mill. This mixture is fired at a firing temperature of 1350° C. for 4 hours in a stream of mixture gas of 97% of nitrogen and 3% of hydrogen as a reductive atmosphere, and then cooled to room temperature for about an hour. The fired material obtained was ground and sieved, and a resultant powder passing through a #250 mesh was determined to be phosphorescent phosphor Sample 2-(1). This Sample 2-(1) comprises of 0.8595 mol of strontium and 0.0955 mol of barium, wherein the molar ratio of strontium relative to the total mole number of strontium and barium (0.955 mol) is 0.9, and the molar ratio of barium is 0.1. Further, the amount of doped europium relative to the total amount of strontium, barium, europium and dysprosium is 3 mol %, the amount of doped dysprosium is similarly 1.5 mol %, and the molar ratio of dysprosium to europium, i.e., Dy/Eu, is 0.5. Moreover, the molar ratio of aluminum, i.e., Al/(Sr+Ba+Eu+Dy), is 2.05, which exceeds a stoichiometry ratio of 2.0.

Figure 2:
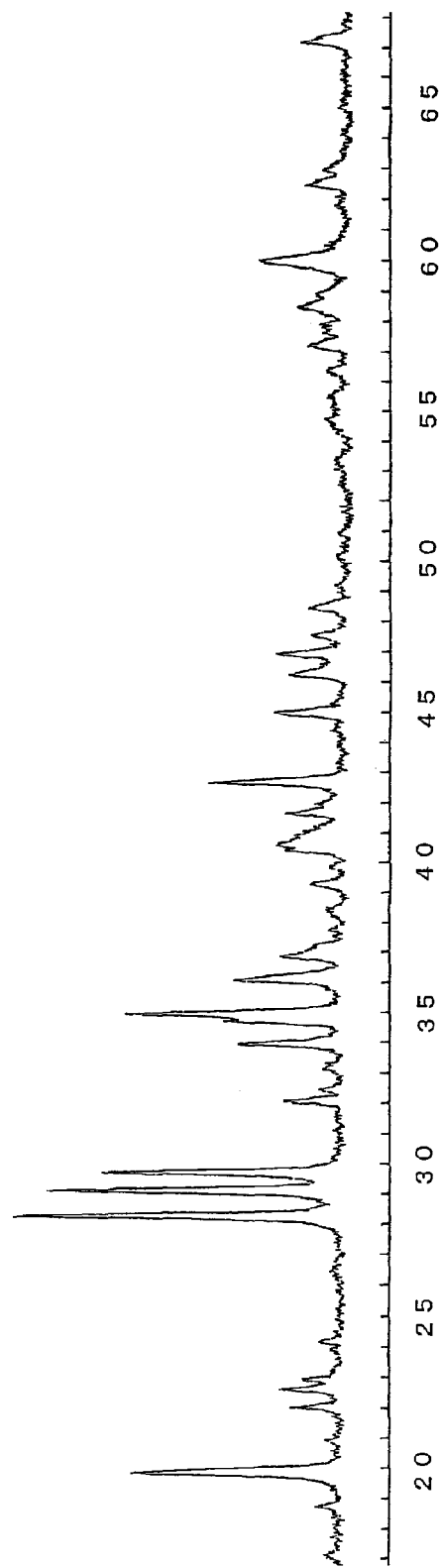
FIG. 2 is a powder X-ray diffraction chart of Sample 2-(9).

Likewise, the molar ratio of aluminum, i.e., Al/(Sr+Eu+Dy) was varied within the range from 2.1 to 3.3 as shown in Table 6 to obtain phosphorescent phosphors as Samples 2-(2) to 2-(13). Furthermore, for Sample 2-(9), i.e., the sample with the molar ratio of aluminum of 2.9, powder X-ray diffraction analysis was carried out using a Cu vessel, and a diffraction chart was obtained. This is shown in FIG. 2.

TABLE 6

| Samples | Conditions<br>M = Sr + Ba (Sr = 0.9, Ba = 0.1) Eu = 3 mol %,<br>Dy = 1.5 mol % (relative to M + Eu + Dy)<br>Al/(M + Eu + Dy) |
|---|---|
| Sample 2-(1) | 2.05 |
| Sample 2-(2) | 2.1 |
| Sample 2-(3) | 2.2 |
| Sample 1-(4) | 2.3 |
| Sample 2-(4) | 2.4 |
| Sample 2-(5) | 2.5 |
| Sample 2-(6) | 2.6 |
| Sample 2-(7) | 2.7 |
| Sample 2-(8) | 2.8 |
| Sample 2-(9) | 2.9 |
| Sample 2-(10) | 3.0 |
| Sample 2-(11) | 3.1 |
| Sample 2-(12) | 3.2 |
| Sample 2-(13) | 3.3 |

Next, these Samples 2-(1) to 2-(13) were excited under the excitation condition of low illumination (4200 K fluorescent lamp, 54 lx, 60 minutes) in the same manner as described for Sample 1-(1), and their afterglow luminance characteristics were examined. The results thereof, as well as the results for Sample 1-(4) excited under the same conditions except for the molar ratio of aluminum is 2.3, are shown in Table 7 as relative luminance where the afterglow luminance of Comparative Example 1 assumed to be 1.

TABLE 7

| | Excitation conditions<br>FL (4200 K), 54 lx, 60 minutes<br>Afterglow luminance characteristics (relative values where the value of Comparative Example 1 is 1.0) | | | | |
|---|---|---|---|---|---|
| Samples | 5 minutes | 10 minutes | 20 minutes | 60 minutes | 90 minutes |
| Comparative Example 1 | 1.00 | 1.00 | 1.00 | 1.00 | 1.00 |
| Sample 2-(1) | 1.60 | 1.61 | 1.66 | 1.93 | 2.00 |
| Sample 2-(2) | 1.78 | 1.83 | 1.93 | 2.33 | 2.44 |
| Sample 2-(3) | 2.03 | 2.14 | 2.26 | 2.79 | 2.95 |
| Sample 1-(4) | 2.00 | 2.12 | 2.23 | 2.76 | 2.81 |
| Sample 2-(4) | 2.00 | 2.13 | 2.24 | 2.76 | 2.84 |
| Sample 2-(5) | 1.99 | 2.11 | 2.23 | 2.70 | 2.82 |
| Sample 2-(6) | 1.98 | 2.10 | 2.23 | 2.68 | 2.80 |
| Sample 2-(7) | 1.88 | 1.91 | 2.03 | 2.45 | 2.59 |
| Sample 2-(8) | 1.80 | 1.83 | 1.95 | 2.35 | 2.49 |
| Sample 2-(9) | 1.72 | 1.75 | 1.88 | 2.27 | 2.40 |
| Sample 2-(10) | 1.63 | 1.68 | 1.79 | 2.18 | 2.31 |
| Sample 2-(11) | 1.56 | 1.60 | 1.68 | 1.99 | 2.17 |
| Sample 2-(12) | 1.48 | 1.55 | 1.65 | 1.96 | 2.12 |
| Sample 2-(13) | 1.38 | 1.42 | 1.55 | 1.94 | 2.06 |

From the results shown in Table 7, it is apparent that in all of Samples 2-(2) to 2-(9), i.e., where the molar ratio of aluminum ranges from 2.1 to 2.9, the afterglow luminance characteristics, particularly the initial afterglow luminance characteristics at 5 minutes after cessation of the excitation are excellent showing more than about 1.7 times as high as that of Comparative Example 1, and the afterglow luminance characteristics at 90 minutes are excellent showing more than about 2 times as high as that of Comparative Example 1.

Further, in Samples 2-(3) to 2-(6) (the molar ratio of aluminum ranges from 2.2 to 2.6), the afterglow luminance characteristics at 5 minutes are about 2 times or more times as high as that of Comparative Example 1, and the afterglow luminance at 90 minutes is 2.8 or more times as high as that of Comparative Example 1, and thus it is apparent that these samples have more preferable excellent afterglow luminance characteristics. Their excellent afterglow luminance characteristics are ascribable to the fact that the molar ratio of aluminum is greater than 2.0, so that crystals are distorted. However, in Sample 2-(1) (the molar ratio of aluminum is 2.05), though the afterglow luminance characteristics at 90 minutes is excellent showing 2 times as high as that of Comparative Example 1, the afterglow luminance characteristics after 5 minutes is only about 1.6 times as high as that of Comparative Example 1. Moreover, in Samples 2-(10) to 2-(13) (the molar ratio of aluminum ranges from 3 to 3.3), a general decrease in afterglow luminance is observed. The general decrease in luminance is ascribable to the fact that the molar ratio of aluminum increases, whereby occurrence of, for example, aluminates other than $(Sr, Ba)Al_2O_4$, as by-products increases.

From this fact, it is apparent that when a compound expressed by $MAl_2O_4$ in which M comprises of strontium (Sr) and barium (Ba) is used as a matrix, a phosphorescent phosphor having excellent afterglow luminance characteristics is obtained in case that the molar ratio of aluminum relative to the total mole number of strontium, barium, europium and dysprosium, i.e., Al/(Sr+Ba+Eu+Dy) ranges from 2.1 to 2.9.

The ratio of barium and the initial afterglow luminance characteristics where metal elements expressed by M comprise of strontium (Sr) and barium (Ba) will now be described.

First, as a raw material of barium (Ba), 37.69 g (0.191 mol) of barium carbonate ($BaCO_3$) is added to 112.79 g (0.764 mol) of strontium carbonate ($SrCO_3$) as a raw material of strontium (Sr), 5.28 g (0.03 mol as Eu) of europium oxide ($Eu_2O_3$) as a raw material of europium as an activator is doped, 2.80 g (0.015 mol as Dy) of dysprosium oxide ($Dy_2O_3$) as a raw material of dysprosium (Dy) as a co-activator is doped, 117.26 g (2.3 mol as Al, i.e., Al/(Sr+Ba+Eu+Dy)=2.3) of alumina ($Al_2O_3$) as an aluminum raw material is added, 3.3 g (i.e., 1.2% by mass relative to the raw material) of boric acid ($H_3BO_3$) as a boron (B) compound as flux is added, and a resultant mixture is sufficiently mixed using a ball mill. This mixture is fired at a firing temperature of 1350° C. for 4 hours in a stream of mixture gas of 97% nitrogen and 3% of hydrogen as a reductive atmosphere, and then cooled to room temperature for about an hour. The fired material obtained was ground and sieved, and a resultant powder passing through a #250 mesh was determined to be phosphorescent phosphor Sample 3-(7). This Sample 3-(7) comprises of 0.764 mol of strontium and 0.191 mol of barium, wherein the molar ratio of strontium relative to the total mole number of strontium and barium (0.955 mol) is 0.8, and the molar ratio of barium is similarly 0.2. Further, the doped amount of europium relative to the total amount of strontium, barium, europium and dysprosium is 3 mol %, the doped amount of dysprosium is similarly 1.5 mol %, and the molar ratio of dysprosium to europium, i.e., Dy/Eu, is 0.5. Moreover, the molar ratio of aluminum, i.e., Al/(Sr+Ba+Eu+Dy), is 2.3, which exceeds the stoichiometry ratio of 2.0.

Figure 3:
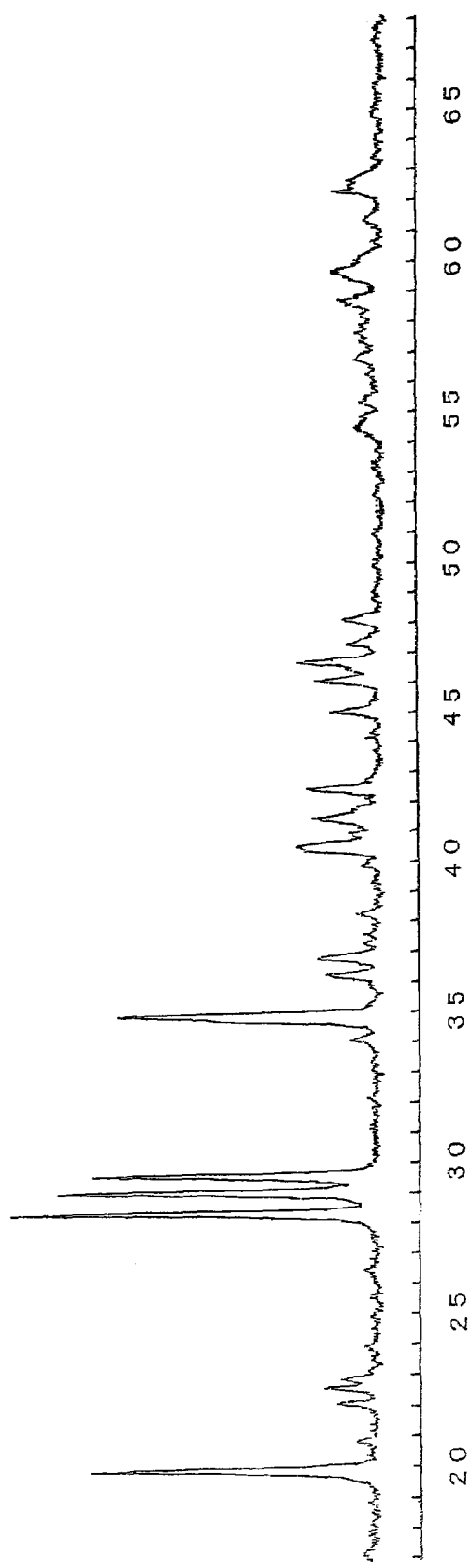
FIG. 3 is a powder X-ray diffraction chart of Sample 3-(7).

Likewise, the blending ratio of strontium and barium was varied within the range from 0.99:0.01 to 0.7:0.3 (Sr:Ba) as shown in Table 8 to obtain phosphorescent phosphors as Samples 3-(1) to 3-(6), 3-(8) and 3-(9). Furthermore, for Sample 3-(7), powder X-ray diffraction analysis was carried out using a Cu vessel, and a diffraction chart was obtained. This chart is shown in FIG. 3.

TABLE 8

| | Conditions<br>M = Sr + Ba<br>Eu = 3 mol %, Dy = 1.5 mol %<br>(relative to M + Eu + Dy)<br>Al/(M + Eu + Dy) = 2.3 | |
|---|---|---|
| Samples | Sr/(Sr + Ba) | Ba/(Sr + Ba) |
| Sample 3-(1) | 0.99 | 0.01 |
| Sample 3-(2) | 0.97 | 0.03 |
| Sample 3-(3) | 0.96 | 0.04 |
| Sample 3-(4) | 0.95 | 0.05 |
| Sample 1-(4) | 0.9 | 0.1 |
| Sample 3-(5) | 0.85 | 0.15 |
| Sample 3-(6) | 0.83 | 0.17 |
| Sample 3-(7) | 0.8 | 0.2 |
| Sample 3-(8) | 0.75 | 0.25 |
| Sample 3-(9) | 0.7 | 0.3 |

Next, these Samples 3-(1) to 3-(9) were excited under the excitation condition of low illumination (4200 K fluorescent lamp, 54 lx, 60 minutes) in the same manner as that described for Sample 1-(1) of Example 1, and their afterglow luminance characteristics were examined. The results thereof, as well as those of Sample 1-(4) excited under the same conditions except that the blending ratio of strontium and barium is 0.9:0.1, are shown in Table 9 as relative luminance where the afterglow luminance of Comparative Example 1 assumed to be 1.

TABLE 9

| | Excitation<br>conditions<br>FL (4200 K), 54 lx, 60 minutes<br>Afterglow luminance characteristics (relative values<br>where the value of Comparative Example 1 is 1.0) | | | | |
|---|---|---|---|---|---|
| Samples | 5<br>minutes | 10<br>minutes | 20<br>minutes | 60<br>minutes | 90<br>minutes |
| Comparative Example 1 | 1.00 | 1.00 | 1.00 | 1.00 | 1.00 |
| Sample 3-(1) | 1.90 | 1.82 | 1.74 | 1.64 | 1.56 |
| Sample 3-(2) | 1.98 | 1.95 | 1.89 | 1.98 | 1.95 |
| Sample 3-(3) | 1.99 | 1.98 | 1.94 | 2.08 | 2.04 |
| Sample 3-(4) | 2.00 | 2.01 | 1.99 | 2.17 | 2.12 |
| Sample 1-(4) | 2.00 | 2.12 | 2.23 | 2.76 | 2.81 |
| Sample 3-(5) | 1.83 | 1.95 | 2.02 | 2.35 | 2.40 |
| Sample 3-(6) | 1.77 | 1.87 | 1.93 | 2.13 | 2.17 |
| Sample 3-(7) | 1.69 | 1.76 | 1.81 | 1.94 | 1.97 |
| Sample 3-(8) | 1.37 | 1.52 | 1.60 | 1.64 | 1.64 |
| Sample 3-(9) | 1.02 | 1.12 | 1.20 | 1.28 | 1.25 |

From the results shown in Table 9, it is apparent that in all of Samples 3-(2) to 3-(7), i.e., where the ratio of barium ranges from 0.03 to 0.2, the afterglow luminance characteristics, particularly the initial afterglow luminance characteristics at 5 minutes after cessation of the excitation, are excellent showing about 1.7 or more times as high as that of Comparative Example 1, and the afterglow luminance characteristics at 90 minutes are excellent showing about 2 or more times as high as that of Comparative Example 1. Further, it is apparent that in Samples 3-(3), 3-(4) and 1-(4), i.e., in the condition in which the ratio of barium ranges from 0.05 to 0.1, the afterglow luminance characteristics at 5 minutes are more preferable showing approximately 2 times as high as that of Comparative Example 1, and in Samples 1-(4) and 3-(5), i.e., in the condition in which the ratio of barium ranges from 0.1 to 0.15, the afterglow luminance characteristics at 90 minutes are more preferable and excellent showing 2.4 or more times as high as that of Comparative Example 1. However, in Sample 3-(1), i.e., where the ratio of barium is 0.01, though the initial afterglow luminance characteristics at 5 minutes is excellent showing 1.9 times as high as that of Comparative Example 1, the afterglow luminance characteristics at 90 minutes is only about 1.56 times as high as that of Comparative Example 1. Moreover, in Samples 3-(8) and 3-(9), i.e., where the ratio of barium ranges from 0.25 to 0.3 exceeding 0.2, the ratio of strontium relatively decreases, and resultantly the afterglow luminance decreases generally.

From this fact, it is apparent that when metal elements expressed by M comprise of strontium and barium, a phosphorescent phosphor having excellent afterglow luminance characteristics is obtained in the case that the ratio of barium to M, i.e., Ba/(Sr+Ba) ranges from 0.03 to 0.2.

Furthermore, in order to examine the luminous wavelengths of the phosphorescent phosphors comprising of strontium and barium as the metal elements expressed by M, the above-described samples were measured by an emission spectrum measuring apparatus, and resultantly it was found that the peak of their luminous wavelength was slightly shifted to shorter wavelength, compared to a phosphorescent phosphor comprising only of strontium as the metal element expressed by M. Therefore, the light emission shows, even though slightly, bluish.

(2) EXAMPLE 2

As another example of the embodiment described above, an example in which calcium is used instead of barium (Ba) as a structural element of the metal elements expressed by M, i.e., the metal elements expressed by M comprise of strontium (Sr) and calcium (Ca), will now be described.

First, as a raw material of calcium (Ca), 9.56 g (0.0955 mol) of calcium carbonate ($CaCO_3$) is added to 126.89 g (0.8595 mol) of strontium carbonate ($SrCO_3$) as a raw material of strontium (Sr), 5.28 g (0.03 mol as Eu) of europium oxide ($Eu_2O_3$) as a raw material of europium as an activator is doped, 2.80 g (0.015 mol as Dy) of dysprosium oxide ($Dy_2O_3$) as a raw material of dysprosium (Dy) as a co-activator is doped, 117.26 g (2.3 mol as Al, i.e., Al/(Sr+Ca+Eu+Dy)=2.3) of alumina ($Al_2O_3$) as an aluminum raw material is added, 3.1 g (i.e., 1.2% by mass relative to the raw material) of boric acid ($H_3BO_3$) as a boron (B) compound as flux is added, and a resultant mixture is sufficiently mixed using a ball mill. This mixture is fired at a firing temperature of 1350° C. for 4 hours in a stream of mixture gas of 97% of nitrogen 3% of hydrogen as a reductive atmosphere, and then cooled to room temperature for about an hour. The fired material obtained was ground and sieved, and a resultant powder passing through a #250 mesh was determined to be phosphorescent phosphor Sample 4-(5). This Sample 4-(5) comprises of 0.8595 mol of strontium and 0.0955 mol of calcium, wherein the molar ratio of strontium relative to the total mole number of strontium and calcium (0.955 mol) is 0.9, and the molar ratio of calcium is 0.1. Further, the doped amount of europium relative to the total amount of strontium, calcium, europium and dysprosium is 3 mol %, the doped amount of dysprosium is similarly 1.5 mol %, and the molar ratio of dysprosium to europium, i.e., Dy/Eu, is 0.5. Moreover, the molar ratio of aluminum, i.e., Al/(Sr+Ca+Eu+Dy), is 2.3, which exceeds a stoichiometry ratio of 2.0.

Likewise, the blending ratio of strontium and calcium was varied within the range from 0.997:0.003 to 0.8:0.2 (Sr:Ca) as shown in Table 10 to obtain phosphorescent phosphors as Samples 4-(1) to 4-(4), 4-(6) and 4-(7).

TABLE 10

| | Conditions<br>M = Sr + Ca<br>Eu = 3 mol %, Dy = 1.5 mol %<br>(relative to M + Eu + Dy)<br>Al/(M + Eu + Dy) = 2.3 | |
|---|---|---|
| Samples | Sr/(Sr + Ca) | Ca/(Sr + Ca) |
| Sample 4-(1) | 0.997 | 0.003 |
| Sample 4-(2) | 0.995 | 0.005 |
| Sample 4-(3) | 0.99 | 0.01 |
| Sample 4-(4) | 0.95 | 0.05 |
| Sample 4-(5) | 0.9 | 0.1 |
| Sample 4-(6) | 0.85 | 0.15 |
| Sample 4-(7) | 0.8 | 0.2 |

Next, these Samples 4-(1) to 4-(7) were excited under the excitation condition of low illumination (4200 K fluorescent lamp, 54 lx, 60 minutes) in the same manner as that described for Sample 1-(1), and their afterglow luminance characteristics were examined. The results thereof are shown in Table 11 as relative luminances where the afterglow luminance of Comparative Example 1 assumed to be 1.

TABLE 11

| | Excitation<br>conditions<br>FL (4200 K), 54 lx, 60 minutes<br>Afterglow luminance characteristics (relative values<br>where the value of Comparative Example 1 is 1.0) | | | | |
|---|---|---|---|---|---|
| Samples | 5 minutes | 10 minutes | 20 minutes | 60 minutes | 90 minutes |
| Comparative Example 1 | 1.00 | 1.00 | 1.00 | 1.00 | 1.00 |
| Sample 4-(1) | 1.54 | 1.42 | 1.37 | 1.20 | 1.12 |
| Sample 4-(2) | 1.64 | 1.54 | 1.38 | 1.20 | 1.19 |
| Sample 4-(3) | 1.54 | 1.48 | 1.39 | 1.23 | 1.21 |
| Sample 4-(4) | 1.46 | 1.46 | 1.47 | 1.39 | 1.33 |
| Sample 4-(5) | 1.38 | 1.28 | 1.22 | 1.12 | 1.18 |
| Sample 4-(6) | 1.05 | 1.00 | 0.94 | 0.91 | 0.89 |
| Sample 4-(7) | 0.42 | 0.40 | 0.36 | 0.31 | 0.29 |

From the results shown in Table 11, it is apparent that in Samples 4-(2) to 4-(5), i.e., where the ratio of calcium ranges from 0.005 to 0.1, the afterglow luminance characteristics, particularly the initial afterglow luminance characteristics at 5 minutes after cessation of the excitation, are excellent showing about 1.4 or more times as high as that of Comparative Example 1, and the afterglow luminance characteristics at 90 minutes are excellent showing about 1.2 or more times as high as that of Comparative Example 1. Further, it is apparent that in Sample 4-(2) (the ratio of calcium to M is 0.005), the afterglow luminance characteristics at 5 minutes is more preferable showing 1.64 times as high as that of Comparative Example 1, and in Sample 4-(4) (the ratio of calcium to M is 0.05), the afterglow luminance characteristics at 90 minutes is more preferable showing 1.33 times as high as that of Comparative Example 1. However, in Sample 4-(1) (the ratio of calcium to M is 0.003), the afterglow luminance characteristics at 90 minutes is only 1.12 times as high as that of Comparative Example 1 and hence not so effective. Moreover, in Samples 4-(6) and 4-(7) (the ratio of calcium to M ranges 0.15 to 0.2), the ratio of strontium relatively decreases, and resultantly the afterglow luminance decreases generally.

From this fact, it is apparent that when the metal elements expressed by M comprise of strontium and calcium, the phosphorescent phosphor shows superior afterglow luminance characteristics to those of conventional phosphorescent phosphors in case that the ratio of calcium to M, i.e., Ca/(Sr+Ca) ranges from 0.005 to 0.1, though not so high as those of the phosphorescent phosphor having strontium and barium as the metal elements expressed by M.

Furthermore, in order to examine the luminous wavelengths of the phosphorescent phosphors comprising of strontium and calcium as the metal elements expressed by M, the above-described samples were measured by an emission spectrum measuring apparatus, and resultantly it was found that the peak of their luminous wavelength was slightly shifted to longer wavelength, compared to a phosphorescent phosphor comprising only of strontium as the metal element expressed by M. Therefore, the light emission shows, even though slightly, yellowish.

(3) EXAMPLE 3

As still another example of the embodiment described above, an example in which the metal elements expressed by M comprise of strontium (Sr), barium (Ba) and calcium (Ca) will now be described.

First, as a raw material of barium (Ba), 18.85 g (0.0955 mol) of barium carbonate ($BaCO_3$) is added to 119.84 g (0.81175 mol) of strontium carbonate ($SrCO_3$) as a raw material of strontium (Sr), 4.78 g (0.04775 mol) of calcium carbonate ($CaCO_3$) as a raw material of calcium (Ca) is added, 5.28 g (0.03 mol as Eu) of europium oxide ($Eu_2O_3$) as a raw material of europium as an activator is doped, 2.80 g (0.015 mol as Dy) of dysprosium oxide ($Dy_2O_3$) as a raw material of dysprosium (Dy) as a co-activator is doped, 117.26 g (2.3 mol as Al, i.e., Al/(Sr+Ba+Ca+Eu+Dy)=2.3) of alumina ($Al_2O_3$) as an aluminum raw material is added, 3.2 g (i.e., 1.2% by mass relative to the raw material) of boric acid ($H_3BO_3$) as a boron (B) compound as flux is added, and a resultant mixture is sufficiently mixed using a ball mill. This mixture is fired at a firing temperature of 1350° C. for 4 hours in a stream of mixture gas of 97% of nitrogen and 3% of hydrogen as a reductive atmosphere, and then cooled to room temperature for about an hour. The fired material obtained was ground and sieved, and a resultant powder passing through a #250 mesh was determined to be phosphorescent phosphor Sample 5-(4). This Sample 5-(4) comprises of 0.81175 mol of strontium, 0.0955 mol of barium and 0.04775 mol of calcium, wherein the molar ratio of strontium relative to the total mole number of strontium, barium and calcium (0.955 mol) is 0.85, the molar ratio of barium is 0.1, and the molar ratio of calcium is 0.05. Further, the doped amount of europium relative to the total amount of strontium, barium, calcium, europium and dysprosium is 3 mol %, the doped amount of dysprosium is similarly 1.5 mol %, and the molar ratio of dysprosium to europium, i.e., Dy/Eu, is 0.5. Moreover, the molar ratio of aluminum, i.e., Al/(Sr+Ba+Ca+Eu+Dy), is 2.3, which exceeds a stoichiometry ratio of 2.0.

Likewise, the molar ratio of barium to M was fixed to 0.1, a value considered suitable in Example 1, and the blending ratio of strontium and calcium was varied within the range from 0.003 to 0.2 (Ca) as shown in Table 12 to obtain phosphorescent phosphors as Samples 5-(1) to 5-(3) and 5-(5) to 5-(7).

TABLE 12

| | Conditions<br>M = Sr + Ca<br>Eu = 3 mol %, Dy = 1.5 mol % (relative to M + Eu + Dy)<br>Al/(M + Eu + Dy) = 2.3 | | |
|---|---|---|---|
| Samples | Sr/(Sr + Ba + Ca) | Ba/(Sr + Ba + Ca) | Ca/(Sr + Ba + Ca) |
| Sample 5-(1) | 0.897 | 0.1 | 0.003 |
| Sample 5-(2) | 0.895 | 0.1 | 0.005 |
| Sample 5-(3) | 0.89 | 0.1 | 0.01 |
| Sample 5-(4) | 0.85 | 0.1 | 0.05 |
| Sample 5-(5) | 0.8 | 0.1 | 0.1 |
| Sample 5-(6) | 0.75 | 0.1 | 0.15 |
| Sample 5-(7) | 0.7 | 0.1 | 0.2 |

Next, these Samples 5-(1) to 5-(7) were excited under the excitation condition of low illumination (4200 K fluorescent lamp, 54 lx, 60 minutes) in the same manner as that described for Sample 1-(1), and their afterglow luminance characteristics were examined. The results thereof are shown in Table 13 as relative luminance where the afterglow luminance of Comparative Example 1 assumed to be 1.

TABLE 13

| | Excitation conditions<br>FL (4200 K), 54 lx, 60 minutes<br>Afterglow luminance characteristics (relative values<br>where the value of Comparative Example 1 is 1.0) | | | | |
|---|---|---|---|---|---|
| Samples | 5 minutes | 10 minutes | 20 minutes | 60 minutes | 90 minutes |
| Comparative Example 1 | 1.00 | 1.00 | 1.00 | 1.00 | 1.00 |
| Sample 5-(1) | 1.85 | 1.87 | 1.90 | 1.88 | 1.92 |
| Sample 5-(2) | 1.92 | 1.99 | 1.95 | 2.17 | 2.22 |
| Sample 5-(3) | 1.92 | 1.99 | 1.99 | 2.23 | 2.25 |
| Sample 5-(4) | 1.92 | 2.03 | 2.17 | 2.40 | 2.40 |
| Sample 5-(5) | 1.31 | 1.38 | 1.42 | 1.58 | 1.58 |
| Sample 5-(6) | 0.65 | 0.78 | 0.77 | 0.79 | 1.78 |
| Sample 5-(7) | 0.52 | 0.51 | 0.51 | 0.51 | 0.48 |

From the results shown in Table 13, it is apparent that in all of Samples 5-(2) to 5-(4) (the ratio of barium is 0.1 and the ratio of calcium ranges from 0.005 to 0.05, i.e., the total ratio of barium and calcium ranges from 0.105 to 0.15), the afterglow luminance characteristics, particularly the afterglow luminance characteristics at 5 minutes after cessation of the excitation, are excellent showing 1.9 or more times as high as that of Comparative Example 1, and the afterglow luminance characteristics after 90 minutes are excellent showing 2 or more times as high as that of Comparative Example 1. Further, in Sample 5-(4) (the ratio of barium to M is 0.1, and the ratio of calcium is 0.05, i.e., the total ratio of barium and calcium is 0.15), the afterglow luminance characteristics after 90 minutes is excellent showing 2.4 times as high as that of Comparative Example 1, and thus it is apparent that the sample has more preferable and excellent afterglow luminance characteristics. However, in Sample 5-(1) (the ratio of calcium to M is 0.003), the afterglow luminance characteristics at 90 minutes is less than 2 times as high as that of Comparative Example 1, and in Samples 5-(5) to 5-(7) (the ratio of barium to M is 0.1, the ratio of calcium ranges from 0.1 to 0.2, i.e., the total ratio of barium and calcium ranges from 0.2 to 0.3), the afterglow luminance decreases generally due to a relative decrease in ratio of strontium and the like, particularly in Samples 5-(6) and 5-(7), the afterglow luminance characteristics are inferior to those of Comparative Example 1.

In addition to these Samples 5-(1) to 5-(7), experiments were conducted while varying the blending ratio of barium and calcium, and for any of the experiments, it was confirmed that the suitable ratio of barium ranges from 0.03 to 0.145, the suitable ratio of calcium ranges from 0.005 to 0.05, and the suitable total ratio of barium and calcium ranges from 0.035 to 0.15.

From this fact, it is apparent that when the metal elements expressed by M comprise of strontium, barium and calcium, the phosphorescent phosphor shows excellent afterglow luminance characteristics in case that the ratio of barium to M, i.e., Ba/(Sr+Ba+Ca) ranges from 0.03 to 0.145, the ratio of calcium to M, i.e., Ca/(Sr+Ba+Ca) ranges from 0.005 to 0.05, and the total ratio of barium and calcium to M, i.e., (Ba+Ca)/(Sr+Ba+Ca) ranges from 0.035 to 0.15, though not so high as those of the phosphorescent phosphor comprising strontium and barium as the metal elements expressed by M.

Furthermore, in order to examine the luminous wavelengths of the phosphorescent phosphors comprising strontium, barium and calcium as the metal elements expressed by M, the above-described samples were measured by an emission spectrum measuring apparatus, and, as a result, no significant shift of the peak of their luminous wavelength were observed compared to the phosphorescent phosphor comprising only of strontium as the metal element expressed by M. It is conceivable that this is because an action of shifting the peak to a shorter wavelength due to existence of barium and another action of shifting the peak to a longer wavelength due to existence of calcium cancel each other out. From these facts, it was found that by using strontium, barium and calcium as the metal elements expressed by M, a phosphorescent phosphor resistant to a shift in the luminous wavelength and having improved afterglow luminance characteristics can be obtained.

INDUSTRIAL APPLICABILITY

The present invention can be applicable for safety applications for use in low illumination environments, such as release handles for escape in automobile trunks and safety signs for escape guidance in subway systems, tunnels, ships, airplanes and the like.

The invention claimed is:
1. A phosphorescent phosphor comprising
   a compound having a $MAl_2O_4$ crystal structure as a matrix, where M comprises strontium (Sr) and barium (Ba),
   europium (Eu) doped to said matrix as an activator, and
   dysprosium (Dy) doped to said matrix as a co-activator;
   an amount of said doped europium (Eu) being more than 1.5% and not more than 5% in terms of mol % relative to a total mole number of the metal elements expressed by M, europium (Eu) and dysprosium (Dy);
   an amount of said doped dysprosium (Dy) ranging $0.3 \leq Dy/Eu \leq 2$ in terms of a molar ratio relative to europium (Eu);
   a ratio of aluminum (Al) ranging from 2.1 to 2.9 in terms of a molar ratio relative to a total mole number of the metal elements expressed by M, europium (Eu) and dysprosium (Dy); and
   a ratio of barium (Ba) to M ranging $0.3 \leq Ba/(Sr+Ba) \leq 0.2$.
2. A phosphorescent phosphor comprising a compound having a $MAl_2O_4$ crystal structure as a matrix, where M comprises strontium (Sr) and calcium (Ca), europium (Eu) doped to said matrix as an activator, and dysprosium (Dy) doped to said matrix as a co-activator;

an amount of said doped europium (Eu) being more than 1.5% and not more than 5% in terms of mol % relative to a total mole number of the metal elements expressed by M, europium (Eu) and dysprosium (Dy);

an amount of said doped dysprosium (Dy) ranging $0.3 \leq Dy/Eu \leq 2$ in terms of a molar ratio relative to europium (Eu);

a ratio of aluminum (Al) ranging from 2.1 to 2.9 in terms of a molar ratio relative to the total mole number of the metal elements expressed by M, europium (Eu) and dysprosium (Dy); and a ratio of calcium (Ca) to M ranging $0.005 \leq Ca/(Sr+Ca) \leq 0.1$.

3. A phosphorescent phosphor comprising a compound having a $MAl_2O_4$ crystal structure as a matrix, where M comprises strontium (Sr), barium (Ba) and calcium (Ca), europium (Eu) doped to said matrix as an activator, and dysprosium (Dy) doped to said matrix as a co-activator;

an amount of said doped europium (Eu) being more than 1.5% and not more than 5% in terms of mol % relative to a total mole number of the metal elements expressed by M, europium (Eu) and dysprosium (Dy);

an amount of said doped dysprosium (Dy) ranging $0.3 \leq Dy/Eu \leq 2$ in terms of a molar ratio relative to europium (Eu);

a ratio of aluminum (Al) ranging from 2.1 to 2.9 in terms of a molar ratio relative to the total mole number of the metal elements expressed by M, europium (Eu) and dysprosium (Dy);

a ratio of barium (Ba) to M ranging $0.03 \leq Ba/(Sr+Ba+Ca) \leq 0.145$;

a ratio of calcium (Ca) to M ranging $0.005 \leq Ca/(Sr+Ba+Ca) \leq 0.05$; and a total ratio of barium (Ba) and calcium (Ca) to M ranging $0.035 \leq (Ba+Ca)/(Sr+Ba+Ca) \leq 0.15$.

4. A method of manufacturing an alkaline-earth metal aluminate phosphorescent phosphor, wherein:

an aluminum (Al) compound, a strontium (Sr) compound, a barium (Ba) compound, a europium (Eu) compound and a dysprosium (Dy) compound are mixed so that molar ratios of the elements meet following requirements:

$0.015 < Eu/(Sr+Ba+Eu+Dy) \leq 0.05$, $0.3 \leq Dy/Eu \leq 2$, $0.03 \leq Ba/(Sr+Ba) \leq 0.2$ and $2.1 \leq Al/(Sr+Ba+Eu+Dy) \leq 2.9$; and a resultant mixture is fired in a reductive atmosphere, and then cooled and ground.

5. A method of manufacturing an alkaline-earth metal aluminate phosphorescent phosphor, wherein:

an aluminum (Al) compound, a strontium (Sr) compound, a calcium (Ca) compound, a europium (Eu) compound and a dysprosium (Dy) compound are mixed so that molar ratios of the elements meet following requirements:

$0.015 < Eu/(Sr+Ca+Eu+Dy) \leq 0.05$, $0.3 \leq Dy/Eu \leq 2$, $0.005 \leq Ca/(Sr+Ca) \leq 0.1$ and $2.1 \leq Al/(Sr+Ca+Eu+Dy) \leq 2.9$; and a resultant mixture is fired in a reductive atmosphere, and then cooled and ground.

6. A method of manufacturing an alkaline-earth metal aluminate phosphorescent phosphor, wherein:

an aluminum (Al) compound, a strontium (Sr) compound, a barium (Ba) compound, a calcium (Ca) compound, a europium (Eu) compound and a dysprosium (Dy) compound are mixed so that molar ratios of the elements meet following requirements:

$0.015 < Eu/(Sr+Ba+Ca+Eu+Dy) \leq 0.05$, $0.3 \leq Dy/Eu \leq 2$, $0.03 \leq Ba/(Sr+Ba+Ca) \leq 0.145$, $0.005 \leq Ca/(Sr+Ba+Ca) \leq 0.05$, $0.035 \leq (Ba+Ca)/(Sr+Ba+Ca) \leq 0.15$ and $2.1 \leq Al/(Sr+Ba+Ca+Eu+Dy) \leq 2.9$; and a resultant mixture is fired in a reductive atmosphere, and then cooled and ground.

7. The method of manufacturing an alkaline-earth metal aluminate phosphorescent phosphor according to claim 4, 5 or 6, wherein a boron compound as flux is added to a raw material; and the resultant mixture is fired.

* * * * *

UNITED STATES PATENT AND TRADEMARK OFFICE
CERTIFICATE OF CORRECTION

PATENT NO. : 7,422,704 B2  
APPLICATION NO. : 10/551424  
DATED : September 9, 2008  
INVENTOR(S) : Yoneichi Hirata et al.

Page 1 of 1

It is certified that error appears in the above-identified patent and that said Letters Patent is hereby corrected as shown below:

Column 24, line 64, should read: --a ratio of barium (Ba) to M ranging $0.03 \leq Ba/(Sr+Ba) \leq 0.2$.--

Column 26, line 36, should read: --$0.005 \leq Ca/(Sr+Ba+Ca) \leq 0.05$,--

Signed and Sealed this

Second Day of December, 2008

JON W. DUDAS  
*Director of the United States Patent and Trademark Office*